(12) United States Patent
Beer et al.

(10) Patent No.: US 11,919,750 B2
(45) Date of Patent: Mar. 5, 2024

(54) CRANE CONTROLLER

(71) Applicant: Hans Kunz GmbH, Hard (AT)

(72) Inventors: Roman Beer, Au (AT); David Moosbrugger, Bezau (AT); Patrick Malouvier, Riezlern (AT)

(73) Assignee: Hans Kunz GmbH, Hard (AT)

( * ) Notice: Subject to any disclaimer, the term of this patent is extended or adjusted under 35 U.S.C. 154(b) by 927 days.

(21) Appl. No.: 16/767,817

(22) PCT Filed: Nov. 21, 2018

(86) PCT No.: PCT/AT2018/000093
§ 371 (c)(1),
(2) Date: May 28, 2020

(87) PCT Pub. No.: WO2019/118992
PCT Pub. Date: Jun. 27, 2019

(65) Prior Publication Data
US 2020/0307966 A1    Oct. 1, 2020

(30) Foreign Application Priority Data

Dec. 21, 2017    (AT) ..................................... 496/2017

(51) Int. Cl.
*B66C 13/46* (2006.01)
*G05G 9/047* (2006.01)

(52) U.S. Cl.
CPC ........ *B66C 13/46* (2013.01); *B60K 2370/135* (2019.05); *B65G 2201/0235* (2013.01);
(Continued)

(58) Field of Classification Search
CPC ....... B66C 13/46; B66C 19/007; B66C 13/56; B60K 2370/135; B65G 2201/0235; G05G 9/04737; G05G 2009/04755; G05G 9/047
See application file for complete search history.

(56) References Cited

U.S. PATENT DOCUMENTS 3,011,739 A * 12/1961 Boyce ................. B64C 13/0421
244/237
3,028,126 A * 4/1962 Holleman ................ G05G 1/62
244/236
(Continued)

FOREIGN PATENT DOCUMENTS

AT          516981       10/2016
DE          19501439     9/1996
(Continued)

*Primary Examiner* — Paul N Dickson
*Assistant Examiner* — Timothy Wilhelm
(74) *Attorney, Agent, or Firm* — Volpe Koenig (57) ABSTRACT

A crane controller for controlling travel movements of a crane, in particular a portal crane. The crane controller includes control electronics and at least one input device, connected to the control electronics, having a grip part, a main axis of the grip part is swivellable together with the grip part in at least two swivel directions oriented, in particular orthogonally, in relation to one another, and the control electronics are able to generate electrical signals, for actuating at least one actuator of the crane, on the basis of an adjustment of the grip part relative to an original position of the grip part. The grip part has its main axis additionally displaceable in at least two, preferably three, different displacement directions relative to the original position and/or is rotatable about the main axis, and the control electronics generate electrical signals for actuating the at least one actuator of the crane.

10 Claims, 6 Drawing Sheets

(52) U.S. Cl.
CPC ............... *G05G 9/04737* (2013.01); *G05G 2009/04755* (2013.01)

(56) References Cited

U.S. PATENT DOCUMENTS

| | | | | |
|---|---|---|---|---|
| 3,117,649 | A * | 1/1964 | Parton | B60W 30/18181 280/775 |
| 3,196,709 | A * | 7/1965 | Bickford | B62D 1/14 D12/175 |
| 3,260,826 | A * | 7/1966 | Johnson | H01H 25/04 338/68 |
| 3,299,731 | A * | 1/1967 | Russell, Jr. | G05G 5/05 244/234 |
| 3,312,123 | A * | 4/1967 | Rumpf | B62D 1/04 74/494 |
| 3,350,956 | A * | 11/1967 | Monge | G05G 9/04737 244/234 |
| 3,388,609 | A * | 6/1968 | Miller | G05G 9/047 74/471 XY |
| 3,831,633 | A * | 8/1974 | Comer | B62D 11/183 74/471 XY |
| 3,897,805 | A * | 8/1975 | Casey | E02F 9/2004 74/471 XY |
| 4,027,547 | A * | 6/1977 | Rahman | G05G 9/047 74/471 XY |
| 4,069,720 | A * | 1/1978 | Thor | G05G 9/04 244/225 |
| 4,084,619 | A * | 4/1978 | Johnson | G05G 7/10 137/636.3 |
| 4,113,054 | A * | 9/1978 | Myers | B66F 11/044 60/486 |
| 4,200,162 | A * | 4/1980 | Tax | B66C 23/78 180/413 |
| 4,422,345 | A * | 12/1983 | Green | G05G 9/047 74/471 XY |
| 4,427,084 | A * | 1/1984 | Savard, Jr. | B62B 3/12 280/DIG. 5 |
| 4,641,849 | A * | 2/1987 | De Cortanze | B62K 21/005 280/270 |
| 4,667,909 | A * | 5/1987 | Curci | B64C 13/0421 244/237 |
| 4,726,248 | A * | 2/1988 | Kawai | B25J 13/02 74/471 XY |
| 4,762,199 | A * | 8/1988 | Holmes | B66F 11/044 182/148 |
| 4,895,039 | A * | 1/1990 | Hegg | G05G 9/04 244/236 |
| 4,920,820 | A * | 5/1990 | Ingham | G05G 5/05 74/471 XY |
| 4,976,582 | A * | 12/1990 | Clavel | B25J 9/1065 108/138 |
| 5,007,300 | A * | 4/1991 | Siva | G05G 9/04737 74/471 XY |
| 5,019,761 | A * | 5/1991 | Kraft | G05B 19/427 318/568.16 |
| 5,050,449 | A * | 9/1991 | Falcou | G05G 9/047 74/625 |
| 5,107,080 | A * | 4/1992 | Rosen | H01H 3/605 200/6 A |
| 5,116,180 | A * | 5/1992 | Fung | B25J 9/1689 414/909 |
| 5,160,918 | A | 11/1992 | Saposnik et al. | |
| 5,182,961 | A * | 2/1993 | Menahem | G05G 9/047 244/234 |
| 5,379,663 | A * | 1/1995 | Hara | G05G 9/04 345/161 |
| 5,456,428 | A * | 10/1995 | Hegg | B64C 13/12 244/229 |
| 5,477,597 | A * | 12/1995 | Catania | B21J 15/10 29/33 K |
| 5,497,847 | A * | 3/1996 | Ota | G05G 9/047 180/336 |
| 5,503,040 | A * | 4/1996 | Wright | G05G 9/04737 345/157 |
| 5,587,937 | A * | 12/1996 | Massie | B25J 9/1689 703/7 |
| 5,655,411 | A * | 8/1997 | Avitan | G05G 9/047 74/471 XY |
| 5,692,541 | A * | 12/1997 | Brown | G05G 9/047 137/636.3 |
| 5,724,068 | A * | 3/1998 | Sanchez | G05G 9/047 345/161 |
| 5,752,578 | A * | 5/1998 | Kellogg | F15B 13/0422 74/471 XY |
| 5,755,138 | A * | 5/1998 | Mototani | G05G 9/047 338/68 |
| 5,755,645 | A * | 5/1998 | Miller | A63B 21/153 482/903 |
| 5,769,363 | A * | 6/1998 | Griswold | B64C 13/04 74/553 |
| 5,805,140 | A * | 9/1998 | Rosenberg | G05B 19/4207 345/161 |
| 5,859,372 | A * | 1/1999 | Neltoft | G01L 5/223 250/221 |
| 5,979,264 | A * | 11/1999 | Rosheim | G05G 9/04737 74/490.06 |
| 5,995,893 | A * | 11/1999 | Lee | E02F 9/2004 701/50 |
| 6,019,133 | A | 2/2000 | Riedel et al. | |
| 6,059,660 | A * | 5/2000 | Takada | G05G 9/047 345/161 |
| 6,193,086 | B1 * | 2/2001 | Gunnlaugsson | B66C 13/56 212/290 |
| 6,206,127 | B1 * | 3/2001 | Zakula, Sr. | B66C 19/007 180/234 |
| 6,222,179 | B1 * | 4/2001 | Mikan | G05G 9/047 250/221 |
| 6,250,486 | B1 * | 6/2001 | Enoki | B66C 19/002 212/87 |
| 6,259,433 | B1 * | 7/2001 | Meyers | G05G 9/047 345/161 |
| 6,267,673 | B1 * | 7/2001 | Miyamoto | G06T 15/10 463/31 |
| 6,293,160 | B1 * | 9/2001 | Shigemoto | G06F 3/0338 73/862.632 |
| 6,425,205 | B2 * | 7/2002 | Wygle | E05F 15/619 296/56 |
| 6,437,771 | B1 * | 8/2002 | Rosenberg | A63F 13/245 345/161 |
| 6,573,885 | B1 * | 6/2003 | McVicar | F16D 3/382 345/161 |
| 6,631,652 | B1 * | 10/2003 | Okazawa | E02F 9/2004 74/471 XY |
| 6,642,685 | B2 * | 11/2003 | Onodera | G05G 9/047 345/161 |
| 6,681,880 | B2 * | 1/2004 | Bernhardt | G05G 9/047 341/20 |
| 6,722,224 | B2 * | 4/2004 | Nordstrom | G05G 9/047 74/471 XY |
| 6,805,021 | B2 * | 10/2004 | Kato | F16H 59/105 74/491 |
| 6,837,124 | B2 * | 1/2005 | Tsai | G05G 9/047 74/471 XY |
| 6,880,855 | B2 * | 4/2005 | Chernoff | B60W 30/18181 74/552 |
| 6,966,397 | B2 * | 11/2005 | Yanaka | B62D 6/008 180/315 |
| 7,055,912 | B2 * | 6/2006 | Luscombe | B66F 11/044 182/2.9 |
| 7,236,157 | B2 * | 6/2007 | Schena | A63F 13/24 345/161 |
| 7,252,299 | B2 * | 8/2007 | Wierzba | B66C 9/04 212/270 |
| 7,320,263 | B2 * | 1/2008 | Gustafsson | G05G 5/28 74/471 XY |
| 7,451,883 | B2 * | 11/2008 | Wierzba | B66C 19/005 212/327 |

(56) References Cited

U.S. PATENT DOCUMENTS

| | | | |
|---|---|---|---|
| 7,466,303 B2* | 12/2008 | Yi | A61B 5/7475 345/157 |
| 7,546,929 B2* | 6/2009 | Wierzba | B66C 13/44 212/326 |
| 7,623,945 B2* | 11/2009 | Kraft | B25J 13/02 901/29 |
| 7,675,258 B2* | 3/2010 | Dattilo | G05G 1/04 318/575 |
| 7,701,161 B2* | 4/2010 | Hanlon | B64C 13/345 318/568.1 |
| 7,726,692 B2* | 6/2010 | Ozaki | B62D 1/04 74/543 |
| 7,783,384 B2* | 8/2010 | Kraft | G06F 3/011 901/14 |
| 7,843,426 B2* | 11/2010 | Larson | G05G 9/047 345/161 |
| 8,028,599 B2 | 10/2011 | Mack | |
| 8,087,619 B2* | 1/2012 | Hanlon | G05G 9/047 244/223 |
| 8,096,206 B2* | 1/2012 | Konig | G05G 9/047 74/471 XY |
| 8,100,029 B2* | 1/2012 | Peterson | G05G 9/047 244/234 |
| 8,230,755 B2* | 7/2012 | Ishikawa | G05G 25/02 74/471 XY |
| 8,235,330 B2* | 8/2012 | Rozovski | G05G 9/04 345/161 |
| 8,371,187 B2* | 2/2013 | Payandeh | B25J 13/02 74/471 XY |
| 8,667,860 B2* | 3/2014 | Helmer | B25J 17/0266 901/33 |
| 8,746,103 B2* | 6/2014 | Apkarian | G05G 7/02 74/471 XY |
| 8,770,055 B2* | 7/2014 | Peterson | B64C 13/0421 74/471 XY |
| 8,881,616 B2* | 11/2014 | Dize | G05G 9/047 345/161 |
| 9,050,727 B2* | 6/2015 | Kishi | A61B 34/30 |
| 9,051,836 B2* | 6/2015 | Yates | F01D 7/00 |
| 9,134,187 B1* | 9/2015 | Organ | G05G 5/05 |
| 9,321,614 B2* | 4/2016 | Moran | B66C 13/22 |
| 9,575,504 B2* | 2/2017 | Dize | G05G 9/04788 |
| 9,638,497 B2* | 5/2017 | Summer | B25J 3/00 |
| 9,701,518 B2* | 7/2017 | Rosenström | B66C 19/005 |
| 9,702,118 B2* | 7/2017 | Gorman | E02F 3/32 |
| 9,889,874 B1* | 2/2018 | Clause | G05G 9/04 |
| 2002/0175467 A1* | 11/2002 | Dicus | G05G 9/04792 273/148 R |
| 2002/0190948 A1* | 12/2002 | Coutant | G05G 23/02 345/161 |
| 2003/0126938 A1* | 7/2003 | Nordstrom | G05G 9/047 74/471 XY |
| 2003/0152452 A1* | 8/2003 | Hodgson | G05G 9/047 414/694 |
| 2004/0099081 A1* | 5/2004 | Riwan | B25J 13/02 74/490.01 |
| 2006/0090588 A1* | 5/2006 | Zumbusch | B62D 1/12 74/543 |
| 2006/0156848 A1* | 7/2006 | Gosselin | G06F 3/016 74/471 XY |
| 2006/0254377 A1* | 11/2006 | Henle | G05G 9/047 74/471 XY |
| 2008/0193260 A1* | 8/2008 | Yokokohji | G05G 9/04 901/4 |
| 2009/0266948 A1* | 10/2009 | Hanlon | G05G 9/047 248/201 |
| 2012/0017714 A1* | 1/2012 | Rinaldi | G05G 9/047 74/471 R |
| 2012/0065847 A1 | 3/2012 | Hobenshield | |
| 2014/0160015 A1* | 6/2014 | Ogawa | A61B 34/37 345/156 |
| 2015/0060185 A1* | 3/2015 | Feguri | B62D 1/12 180/333 |
| 2015/0090065 A1* | 4/2015 | Kishi | G05G 23/02 74/491 |
| 2015/0345914 A1* | 12/2015 | Summer | B25J 9/1689 901/1 |
| 2017/0050721 A1* | 2/2017 | Voiles | F16H 19/04 |
| 2018/0029849 A1 | 2/2018 | Beer | |

FOREIGN PATENT DOCUMENTS

| | | |
|---|---|---|
| EP | 818413 | 1/1998 |
| EP | 1980441 | 10/2008 |

\* cited by examiner

CRANE CONTROLLER

TECHNICAL FIELD

The present invention relates to a crane controller for controlling travel movements of a crane, in particular of a gantry crane, wherein the crane controller comprises control electronics and at least one input device which is connected to the control electronics and which has a grip part, wherein a main axis of the grip part is pivotable together with the grip part in at least two pivoting directions oriented, in particular orthogonally, to one another, and the control electronics are capable of generating electrical signals for activating at least one actuator of the crane, in dependence on an adjustment of the grip part relative to an original position of the grip part. Furthermore, the invention relates to an arrangement comprising a control cab and a crane controller, and also to a crane and to a method for controlling travel movements of a crane.

BACKGROUND

Cranes are used to move containers or other loads. Particularly when handling containers, high travel speeds and precise movements of the crane are important in order to achieve high handling capacities. Here, cranes, in particular gantry cranes, have a plurality of degrees of freedom for carrying out the travel movements.

An example of a crane configured as a gantry crane is shown in AT 516981 A1. The gantry crane according to this document can be moved as a whole along crane rails relative to the ground. Furthermore, the crane has a transport device for transporting the container, said device being mounted so as to be displaceable along a crane girder of the crane. The transport device comprises a trolley and a load-receiving device for connection to the container or the other load, wherein the load-receiving device is suspended on the trolley so as to be able to be lifted and lowered by means of cables. According to this document, the free cable length of the cables can be set individually. As a result, the load-receiving device can be precisely oriented relative to the trolley in a fine-positioning mode in order for example to receive an obliquely positioned container or to set it down on another container or on a truck. Overall, the load-receiving device according to this document can be moved in six degrees of freedom.

The multiple travel movements of the load-receiving device, of the trolley and of the crane as a whole are executed by activating actuators of the crane by means of a crane controller. The desired travel movements are input by the crane operator by means of input devices to operate the crane.

It is known in the prior art to use input devices having an adjustable grip part. Such input devices are also referred to as control levers or joysticks. The grip part of the input device is pivotable in at least two mutually different pivoting directions. A degree of the adjustment of the grip part of the input device, starting from an original position of the grip part, can be read by control electronics of the crane controller. The control electronics generate electrical signals for activating the at least one actuator of the crane from the data which describe the degree of adjustment of the grip part.

The crane controller frequently has at least two joysticks in order to allow complicated superimposed travel movements of the crane. The operation of a crane with two joysticks is complex, since both joysticks have to be operated at the same time in order to be able to prescribe the multiple travel movements of the crane and to achieve a high handling capacity. Since, as a rule, translational movements and/or rotational movements of the crane have to be input by means of the joysticks in the form of a pivoting movement of the grip part, the operation of the crane is also not very intuitive and places high concentration demands on the crane operator. Learning the operation of the crane is also time-consuming.

SUMMARY

It is an object of the invention to provide an advantageous crane controller of the type stated at the outset that allows the travel movements of the crane to be prescribed in a more intuitive manner.

This is achieved with a crane controller with one or more features according to the invention.

In the crane controller according to the invention, there is provision that the grip part, with the main axis, is additionally displaceable in at least two, preferably three, mutually different displacement directions relative to the original position and/or can be rotated about the main axis, and the control electronics are capable of generating electrical signals for activating the at least one actuator of the crane, in dependence on the adjustment of the grip part relative to the original position.

As a result, it is possible, in addition to the pivoting movement of the grip part in the at least two pivoting directions, to use displacements of the grip part in at least two displacement directions and/or rotational movements of the grip part about the main axis to input travel movements of the crane, wherein the control electronics, in dependence on the adjustment of the grip part relative to the original position, can generate electrical signals to activate the actuators of the crane. An adjustment of the grip part can thus be at least one pivoting movement of the main axis together with grip part and/or at least one displacement of the main axis together with grip part and/or a rotational movement of the grip part about its main axis or a superimposition of such movements. As a result, additional travel movements of the crane can be prescribed very intuitively with the input device of the crane controller according to the invention. This significantly simplifies the operation of the crane, since additional travel movements of the crane can be input or prescribed with a single input device.

A further adjustment of the grip part starting from an already-occurred adjustment of the grip part relative to the original position is likewise considered to be an adjustment relative to the original position within the sense of the invention.

If the grip part is displaceable in at least two mutually different displacement directions, it could also be said that the main axis of the grip part, together with the grip part, can be displaced, in addition to the pivoting movement in the at least two pivoting directions oriented, in particular orthogonally, to one another, in the at least two mutually different displacement directions.

The two mutually different displacement directions are advantageously oriented orthogonally to one another and in each case orthogonally to the main axis of the grip part.

If the grip part is displaceable in three mutually different displacement directions, there is advantageously provision that two of the displacement directions are oriented orthogonally to one another and oriented in each case orthogonally to the main axis, and that the third of the displacement directions is oriented parallel to the main axis. The grip part is then additionally displaceable along the main axis.

It is advantageous if the main axis of the grip part is pivotable, together with the grip part, in any desired pivoting directions. The main axis of the grip part is then arbitrarily pivotable, together with the grip part, about at least one tilting point situated on the main axis. As a result, it is possible, in addition to the pivoting directions oriented, in particular orthogonally, to one another, for any desired pivoting direction to be input by the crane operator. The simultaneous pivoting movement in any desired pivoting direction can then be expressed as a combined pivoting movement of the main axis in pivoting directions oriented orthogonally to one another.

It is preferred if the grip part is arbitrarily displaceable in the at least two, preferably three, displacement directions. A displacement of the grip part can then be expressed by a combined displacement of the grip part in the at least two, preferably three, displacement directions.

It is particularly preferred if the grip part is arbitrarily displaceable and rotatable starting from the original position. The grip part then has six degrees of freedom for prescribing travel movements of the crane. The six degrees of freedom comprise three translational degrees of freedom and three rotational degrees of freedom. That is to say that the grip part is arbitrarily, in particular simultaneously, displaceable in the three mutually different displacement directions oriented orthogonally to one another and pivotable about the pivoting directions oriented orthogonally to one another and can be rotated about the main axis. As a result, a displacement and/or rotational movement of the grip part in any desired direction can be converted into a corresponding displacement and/or rotational movement of the crane or of the moveable components of the crane, for example a load-receiving device of the crane. Since a spatial travel movement of the crane or of the movable components of the crane can be prescribed by a spatial adjustment of the grip part starting from the original position, a particularly intuitive operation of the crane or of the components of the crane can be realized.

In order to detect the degree of adjustment of the grip part, the input device advantageously has sensors. The sensors could, for example, be opto-electronic sensors. A suitable sensor system is known, for example, from so-called 3D mice for operating computers. The measurement values measured by the sensors can be read in by the control electronics.

The grip part can be gripped and adjusted by a crane operator by hand, preferably a single hand. The grip part could also be referred to as a control body or as a puck.

The control electronics could be a memory-programmable controller or a microcontroller or a computer.

The input device is advantageously connected to the control electronics via a wired or a wireless data connection.

The crane controller according to the invention serves for controlling travel movements of a physically present crane. That is to say that the crane controller is used to control the travel movements of the crane for manipulation of containers or other loads, for example in a container terminal.

In preferred embodiments according to the invention, there is provision that a speed value of the at least one actuator can be varied by the control electronics, and the speed value can be set by the control electronics in dependence on a degree of adjustment of the grip part starting from the original position of the grip part. For example, the at least one actuator of the crane that can be activated by the control electronics can be a variable-speed electric motor, wherein the revolutions per minute, that is to say the speed value of the electric motor, can be set in dependence on the degree of adjustment of the grip part. In another application, the at least one actuator could comprise a settable hydraulic valve for setting a volumetric flow in dependence on the degree of adjustment of the grip part. It is thus possible by varying the volumetric flow for the speed value of a travel movement of a hydraulic cylinder of the actuator to be varied.

Preferably, a relatively large deflection of the grip part starting from the original position leads to a higher speed of the actuator which can be activated by the control electronics than a relatively small deflection. Here, the variation of the speed value can be set to be directly proportional to the degree of adjustment of the grip part. However, it would also be conceivable and possible to provide another dependency function of the speed value on the degree of adjustment, for example a logarithmic dependency.

The grip part advantageously has at least one resetting element for automatically resetting the grip part into the original position. It is possible by releasing the grip part for the travel movements of the crane that can be input by means of the input device to be quickly stopped. For example, the input device could have at least one spring for resetting the grip part into the original position.

There is preferably provision that the crane controller has a switching element which can be switched between a first and a second switching position, wherein a coarse-positioning mode is activated in the first switching position, and a fine-positioning mode of the crane controller is activated in the second switching position. The switching element can, for example, have a switch which has at least two switching positions. The crane controller could have still further switching elements for activating further operating modes of the crane controller. In a further possible embodiment, the switching element could comprise at least two buttons which can be activated alternately.

In a preferred embodiment, the crane controller has an operator-control panel on which the input device, and possibly the at least one switching element, are/is arranged.

It is particularly preferred if the control electronics, in dependence on the switching position of the switching element, are capable of generating electrical signals for different actuators of the crane, in dependence on the adjustment of the grip part relative to the original position. This makes it possible for different travel movements of the crane to be activated with one and the same input device. It is conceivable and possible that only some of the actuators are switched during a switching of the switching element between the first and the second switching position. For example, the same actuators could be able to be activated with different travel speeds. For example, it would be conceivable and possible that, for coarse positioning, that is to say in the coarse-positioning mode of the crane controller, a hoisting gear of the crane is movable at higher travel speeds than in the fine-positioning mode of the crane controller. As a result, in the fine-positioning mode, precise positioning of the load-receiving device of the crane can be carried out.

Furthermore, the invention comprises an arrangement comprising a control cab and a crane controller according to the invention. There is advantageously provision that the at least one input device of the crane controller is arranged in the control cab. It is particularly preferred if the at least one input device of the crane controller is arranged on a control seat arranged in the control cab. The control cab could also be referred to as a crane cab. The control cab serves as a workstation for the crane operator of the crane. For example, the at least one input device could be arranged on an armrest of the control seat. The optionally present switching element is preferably likewise arranged in the control cab, particularly preferably on the control seat.

In another embodiment according to the invention, it would be conceivable for the at least one input device of the crane controller to be arranged at a remote control station of a remote control system for operating the crane. The remote control station of the remote control system could be arranged, for example, in a building. The remote control station could also be referred to as a remote operation station. Such arrangements for remote control of a crane are known per se. The remote control system could comprise at least one camera arranged on the crane for monitoring the crane movements, the recording of said movements being able to be displayed to the crane operator live on at least one screen of the remote control station, in order to assist the operation of the crane. The optionally present switching element is preferably likewise arranged at the remote control station. Furthermore, it would be conceivable and possible for the at least one input device and the optionally present switching element to be arranged on an, in particular portable, radio remote control of the crane controller. As a result, the operation of the crane is possible from changing locations of the crane operator.

Furthermore, the invention comprises a crane, in particular a gantry crane, wherein the crane comprises at least three actuators which can be activated independently of one another for moving at least one container or another load, and a crane controller according to the invention, wherein there is provision that the control electronics, in dependence on the adjustment of the grip part relative to the original position, are capable of generating electrical signals for activating the actuators of the crane.

What is meant by "actuators which can be activated independently of one another" are drives of the crane that can be activated separately, that is to say individually, and are used to carry out mutually different travel movements of the crane.

There is advantageously provision that up to six or more mutually independent actuators of the crane can be simultaneously activated by means of the crane controller and/or that travel movements of the crane in up to six degrees of freedom can be carried out simultaneously, in dependence on the adjustment of the grip part.

In a preferred embodiment of the crane according to the invention, there can be provision that the actuators of the crane, which can be activated by means of the input device in a or the coarse-positioning mode of the crane controller, comprise at least one travel drive for moving a crane girder of the crane, preferably the entire crane, in mutually opposed crane travel directions, and at least one trolley drive for moving a trolley of the crane along the crane girder in mutually opposed trolley movement directions, and at least one hoisting gear drive for moving a load-receiving device relative to the trolley in mutually opposed lifting/lowering directions.

An adjustment of the grip part of the input device in a first displacement direction which is oriented orthogonally to the main axis of the grip part advantageously serves for inputting or prescribing a travel movement of the crane girder, in particular of the entire crane, in the mutually opposed crane travel directions. That is to say that the control electronics, in dependence on the adjustment of the grip part relative to the original position in the first displacement direction, generate electrical signals for activating the at least one travel drive of the crane.

Analogously, an adjustment of the grip part in a second displacement direction which is oriented orthogonally to the first displacement direction and which is oriented orthogonally to the main axis of the grip part could be used to input or prescribe a travel movement of the trolley along the crane girder. The control electronics thus generate, in dependence on the adjustment of the grip part relative to the original position in the second displacement direction, electrical signals for activating the at least one trolley drive of the crane.

Furthermore, there could be provision that a displacement of the grip part in a third displacement direction which is oriented parallel to the main axis of the grip part serves for inputting or prescribing a travel movement of the load-receiving device relative to the trolley in the mutually opposed lifting/lowering directions. For this purpose, the control electronics, in dependence on the adjustment of the grip part relative to the original position in the third displacement direction, generate electrical signals for activating the at least one hoisting gear drive of the crane.

In summary, it is possible then, in the coarse-positioning mode, for the travel movements of the crane girder, in particular of the entire crane, and of the trolley and of the load-receiving device to be implemented by the control electronics of the crane controller by generating electrical signals for activating the actuators, in dependence on the adjustment of the grip part relative to the original position.

There could be provision that the actuators of the crane, which can be activated by means of the input device in the coarse-positioning mode of the crane controller, additionally comprise at least one rotary drive for rotating the load-receiving device relative to the trolley in a rotation plane preferably oriented orthogonally to the lifting/lowering directions. Rotary drives, also termed slewing gears, are sufficiently well known in crane construction and serve to rotate the container about an, in particular vertical, axis. A rotation of the grip part about the main axis could serve for inputting or prescribing a rotational movement of the load-receiving device in the rotation plane. For this purpose, the control electronics, in dependence on the rotation of the grip part relative to the original position about the main axis of the grip part, generate electrical signals for activating the at least one rotary drive of the crane.

Alternatively or additionally, there can be provision that the actuators of the crane, which can be activated by means of the input device in a or the fine-positioning mode of the crane controller, comprise fine-positioning drives for the fine orientation of the load-receiving device relative to the trolley in the mutually opposed lifting/lowering directions and/or in horizontal directions oriented orthogonal to the lifting/lowering directions and/or for the rolling and/or pitching and/or yawing of the load-receiving device.

In another embodiment according to the invention, there could be provision that the actuators of the crane, which can be activated by means of the input device in the fine-positioning mode of the crane controller, comprise a plurality of hoisting gear drives which can be activated independently of one another for the fine orientation of the load-receiving device relative to the trolley in the mutually opposed lifting/lowering directions and/or in horizontal directions oriented orthogonally to the lifting/lowering directions and/or for the rolling and/or pitching and/or yawing of the load-receiving device.

In the fine-positioning mode of the crane controller, the load-receiving device can be positioned and/or oriented precisely relative to the trolley. In the case of a container connected to the load-receiving device, this makes it possible for the container to be precisely deposited at a predetermined place, for example on an already present container. If no container or another load is connected to the load-receiving device, precise positioning of the load-receiving device relative to the container or to the other load can occur in order to connect said container or load to the load-receiving device.

The yawing of the load-receiving device is also referred to in technical language as skew movement, the rolling as list movement and the pitching as trim movement.

The mutually opposed lifting/lowering directions comprise the direction for lifting the container or the other load in the vertical direction and the lowering of the container or the other load in a vertical direction opposed to the direction for lifting the container.

For example, an adjustment of the grip part of the input device in one of the displacement directions which are oriented orthogonally to the main axis of the grip part could serve for inputting or prescribing a travel movement of the load-receiving device in a corresponding horizontal direction. Furthermore, an adjustment of the grip part in a displacement direction which is oriented parallel to the main axis of the grip part could serve for inputting or prescribing a travel movement of the load-receiving device relative to the trolley in the mutually opposed lifting/lowering directions. Furthermore, a rotation of the grip part about the main axis could serve for inputting or prescribing the yawing of the load-receiving device about the lifting/lowering directions. Furthermore, a pivoting of the grip part in the at least two pivoting directions oriented, in particular orthogonally, to one another could serve for inputting or prescribing the pitching or rolling of the load-receiving device. This makes it possible for, in particular simultaneous, travel movements of the load-receiving device relative to the trolley to be realized in up to six mutually independent translation and rotation directions, that is to say in six degrees of freedom, by an adjustment of the grip part relative to the original position.

With particular preference, there is provision that the coarse-positioning mode is activated in the first switching position of the switching element, and the fine-positioning mode of the crane controller is activated in the second switching position of the switching element. As a result, the crane operator can change between the coarse-positioning mode and the fine-positioning mode. It would be conceivable and possible that switching by means of a switching element is dispensed with. For example, the input device could be activated exclusively for fine positioning in the fine-positioning mode of the crane controller, and the positioning of the crane in the coarse-positioning mode could be carried out with a further input device.

Furthermore, the invention relates to a method for controlling the travel movements of a crane, in particular of a gantry crane, by means of a crane controller according to the invention, wherein the control electronics generate the electrical signals for activating the at least one actuator of the crane, in dependence on the adjustment of the grip part relative to the original position of the grip part in the at least two pivoting directions oriented, in particular orthogonally, to another and/or in the at least two, preferably three, mutually different displacement directions and/or about the main axis. Further method features of preferred embodiment variants of the method result from the descriptions of the device features of the preferred variants.

BRIEF DESCRIPTION OF THE DRAWINGS

Further features and details of preferred design forms of the invention will be explained on the basis of the crane controller according to the invention illustrated in the figures and exemplary embodiments of cranes according to the invention. In the figures.

DETAILED DESCRIPTION

Figure 1:
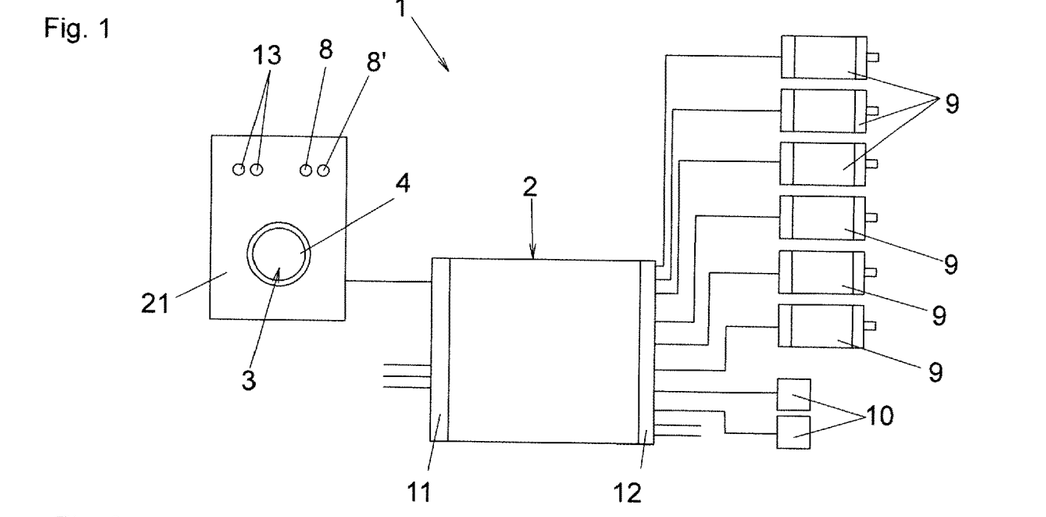
FIG. 1 shows a schematic illustration of a crane controller according to the invention.
Figure 2:
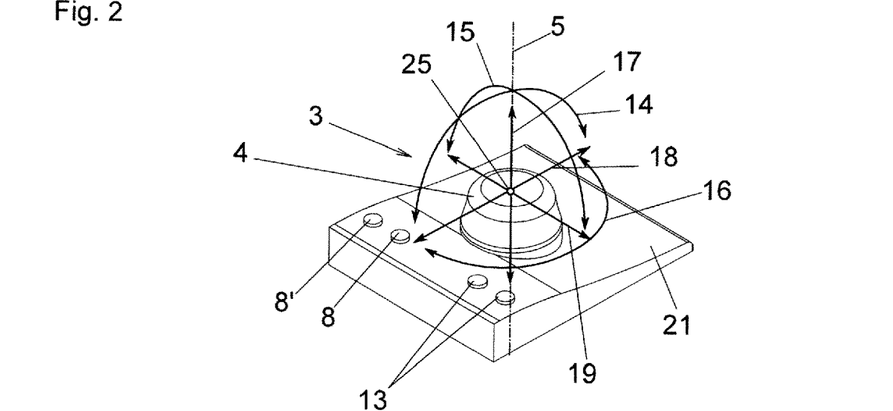
FIG. 2 shows an isometric illustration of an operator-control panel having an input device according to FIG. 1.
Figure 3:
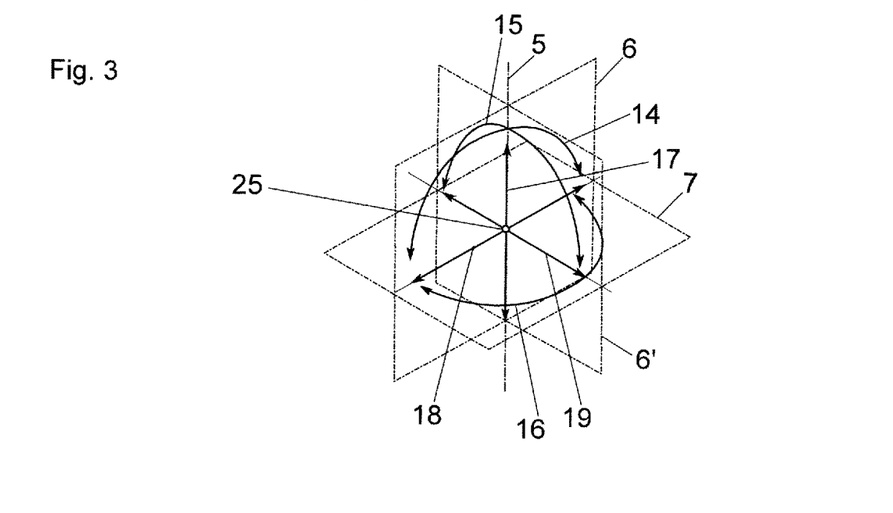
FIG. 3 shows a diagram of the movement possibilities of a grip part of the input device according to FIG. 2.

The example illustrated in FIGS. 1 to 3 of a crane controller 1 according to the invention serves for controlling travel movements of a crane 30. The crane controller 1 comprises control electronics 2. In the exemplary embodiment shown, the control electronics 2 has inputs 11 for inputting operating commands and/or for reading in sensor data of the crane 30. The inputs 11 could also comprise camera inputs and the like which assist a crane operator 24 in the operation of the crane 30. Furthermore, the control electronics 2 have outputs 12 for activating symbolically illustrated actuators 9, 10 of the crane 30. In addition, the crane controller 1 could also have outputs, which are not designated in more detail in FIG. 1, for optical and/or acoustic signaling of variable information of the crane 30, for example screens or loudspeakers.

In the exemplary embodiment, the control electronics 2 take the form of a memory-programmable controller known per se. Other embodiments of the control electronics 2 are also conceivable and possible.

In FIG. 1, the actuators 9, 10 are only schematically illustrated. In FIG. 1, the actuators 9 symbolize electric drives, for example gear motors or linear drives of the crane 30. The actuators 10 symbolize by way of example valves, in particular settable hydraulic valves, which, like the actuators 9, are used to carry out travel movements of the crane 30.

The crane controller 1 comprises an input device 3 having a movable grip part 4, said input device being connected to the control electronics 2 via a data connection, which is not designated in further detail in FIG. 1. In the exemplary embodiment, the input device 3 is arranged on an operator-control panel 21 of the crane controller 1. Furthermore, the operator-control panel 21 comprises switching elements 8, 8' and operator-control elements 13. In the exemplary embodiment, there is provision that the switching elements 8, 8' are arranged separately from the input device 3 on the operator-control panel 21. This could also be otherwise in other embodiments. For example, the switching elements 8, 8' could be arranged on the input device 3, in particular on the grip part 4.

In the exemplary embodiment, the grip part 4 of the input device 3 is displaceable and pivotable in any desired directions by the crane operator 24, starting from an original position of the grip part 4. The input device 3 could be a so-called 3D mouse. Starting from the original position, the grip part 4 thus has six degrees of freedom. That is to say that the grip part 4 of the input device 3 of the exemplary embodiment has, at least starting from the original position, three translational degrees of freedom and three rotational degrees of freedom.

In the exemplary embodiment, there is provision that a main axis 5 of the grip part 4 can be tilted, together with the grip part 4, in any desired directions about at least one tilting point situated on the main axis 5. That is to say that the main axis 5 of the grip part 4 is pivotable, together with the grip part 4, simultaneously in at least two pivoting directions 14, 15 oriented in particular orthogonally to one another, cf. FIGS. 2 and 3. In other words, the main axis 5 of the grip part 4 is pivotable, together with the grip part 4, in any desired directions, wherein the pivoting movement of the main axis 5 starting from the original position of the grip part 4 as illustrated in FIGS. 2 and 3 can be expressed as a superimposition of pivoting movements in the pivoting directions 14, 15 oriented orthogonally to one another.

A pivoting movement of the grip part 4 in the pivoting directions 14 occurs in at least one pivoting plane 6, 6', of which two are illustrated in FIG. 3. A pivoting movement of the grip part 4 in the pivoting directions 15 situated orthogonally to the pivoting directions 14 occurs in the pivoting plane 6'. The pivoting planes 6, 6' are oriented orthogonally to one another and intersect along the main axis 5 of the grip part 4.

Furthermore, there is provision in the exemplary embodiment that the grip part 4 is rotatable about the main axis 5. For this purpose, the rotation directions 16 are depicted in FIGS. 2 and 3.

The pivoting directions 14, 15 and the rotation directions 16 describe the three rotational degrees of freedom of the grip part 4 of the exemplary embodiment.

In the exemplary embodiment, the grip part 4, with the main axis 5, is displaceable in three mutually different displacement directions 17, 18, 19, in each case back and forth, cf. FIGS. 2 and 3. In the exemplary embodiment, the displacement directions 18 and 19 are oriented orthogonally to one another and orthogonally to the main axis 5. The displacement directions 18 and 19 lie in a common main plane 7 which is depicted in FIG. 3. The main plane 7 is thus oriented orthogonally to the main axis 5.

In the exemplary embodiment, the displacement directions 17 are oriented parallel to the main axis 5.

In the exemplary embodiment, the displacement directions 17, 18 and 19 extend along intersection lines between the pivoting planes 6, 6' and the main plane 7, cf. FIG. 3. The displacement directions 17, 18 and 19 describe the three translational degrees of freedom of the grip part 4 of the exemplary embodiment.

It is pointed out that the grip part 4 is not depicted in FIG. 3, but only an imaginary reference point 25 of the grip part 4. The imaginary reference point 25 serves to more clearly illustrate the movement possibilities of the grip part 4 and, for better assignment of the movement possibilities, is also depicted in FIG. 2. The imaginary reference point 25 lies at a point of intersection of the main axis 5 with the main plane 7.

Furthermore, it is separately pointed out that the movement possibilities of the grip part 4 of the input device 3 of the exemplary embodiment are not limited to the pivoting directions 14, 15 and the rotation directions 16 and the displacement directions 17, 18, 19 depicted in FIGS. 2 and 3, but any desired superimpositions of movements are possible which can be expressed in corresponding adjustments of the grip part 4 in the aforementioned directions.

In principle, it could also be said in relation to the exemplary embodiment shown in FIGS. 2 and 3 of the input device 3 that, in addition to any desired pivoting movement, the main axis 5 of the grip part 4 is displaceable from the original position of the grip part 4. Furthermore, the grip part 4 can be rotated about the main axis 5.

In the exemplary embodiment, the main axis 5 is situated substantially parallel to the vertical in the original position. That is to say that the main axis 5 deviates by less than +/−10° from the vertical.

In the exemplary embodiment, the grip part 4 has the shape of a rotational body. In the exemplary embodiment, the grip part 4 could also be referred to as a puck or as an, in particular disk-shaped, control body. The grip part 4 can advantageously be gripped and moved by the crane operator 24 by one hand, in particular by the fingers of the hand.

In the exemplary embodiment, the grip part 4 has at least one resetting element, for example at least one mechanical spring, for automatically resetting the grip part 4 into the original position. Releasing the grip part 4 thus causes the latter to automatically assume the original position.

The input device 3 has sensors, which are not illustrated in further detail, for detecting the adjustment, that is to say the rotations and displacements, of the grip part 4 from the original position of the grip part 4 in the pivoting directions 14, 15 and the rotation directions 16 and the displacement directions 17, 18, 19. For example, the sensors could be potentiometers or opto-electronic sensors. Such sensors are sufficiently well known in input devices for computers. The measurement values which are measured by the sensors and which describe the degree of adjustment of the grip part 4 relative to the original position 4 can be read by the control electronics 2.

Furthermore, the control electronics 2 are capable of generating electrical signals for activating the actuators 9, 10 of the crane 30, in dependence on the adjustment of the grip part 4 relative to the original position in the pivoting directions 14, 15 and the rotation directions 16 and the displacement directions 17, 18, 19.

This will now be generally explained by way of a simple example on the basis of FIG. 3. In this example, there could be provision that an adjustment of the grip part 4 in one of the aforementioned displacement directions 18, 19 is used to activate one of the actuators 9, and a displacement in the other of the displacement directions 18, 19 is used to activate a further actuator 9. As a result of a combined adjustment of the grip part in the main plane 7 in which the displacement directions 18, 19 lie, the control electronics 2 generate electrical signals for both actuators 9 in dependence on the degree of adjustment of the grip part 4 in the displacement directions 18, 19. If the degree of adjustment in the main plane 7 in one of the displacement directions 18, 19 is equal to zero, the assigned actuator 9 is also advantageously not driven, etc. The actuators 9 of this simple example can thus be activated independently of one another.

Conceptually, the degree of adjustment of the grip part 4 could also be considered as a vector and/or tensor. To remain with the example of a simple two-dimensional displacement of the grip part 4 in the main plane 7, an adjustment of the grip part in the main plane 7 could be expressed by breaking down the vector, which describes the displacement of the grip part 4, into vector components which are situated parallel to the displacement directions 18, 19, or could be measured by the sensors of the input device 3. The control electronics 2 again determine from the measurement values the corresponding electrical signals for activating the aforementioned actuators 9.

This example can be correspondingly applied to an, in particular combined, pivoting movement in the pivoting directions 14, 15 and/or a rotation movement of the grip part 4 about the main axis 5 and/or a displacement of the grip part parallel to the main axis 5 in the displacement direction 17. It would thus be possible for example for six mutually independent actuators of the crane 30 to be activated.

In the exemplary embodiment shown in FIGS. 1 to 3 of the crane controller 1, there is provision that a speed value of the at least one actuator 9, 10 can be varied by the control electronics 2, and the speed value can be set by the control electronics 2 in dependence on a degree of adjustment of the grip part 4 starting from the original position of the grip part 4.

In the exemplary embodiment, there is provision that the speed values of the actuators 9, 10 which can be activated by the input device 3 or the control electronics 2 are equal to zero in the original position. For example, the actuators 9 could comprise electric motors which can be activated in a speed-variable manner, for example by a frequency converter. It is thus possible for travel movements of the crane 30 to be precisely input or prescribed. The actuators 10 could, for example, be settable hydraulic valves, wherein a volumetric flow of the hydraulic valve is settable in dependence on the degree of adjustment of the grip part 4.

In the exemplary embodiment of the crane controller 1, there is provision that a respective switching element 8, 8' can be switched between a first and second switching position. In the exemplary embodiment, the switching element 8, 8' in each case comprises a switch. Switching the switching element 8, 8' allows various ones of the actuators 9, 10 to be activated by the input device 3. This is particularly advantageous for realizing different operating modes of the crane 30. For example, a coarse-positioning mode could be activated in the first switching position of the switching element 8, and a fine-positioning mode of the crane controller 1 could be activated in the second switching position. Further operating modes of the crane controller 1 could be able to be activated by the further switching element 8'. The meaning of the coarse-positioning mode and of the fine-positioning mode will be discussed further in the course of the explanations pertaining to the following application examples of the crane controller 1 in the cranes 30 according to the invention. In principle, it would be conceivable that the allocation of actuators 9, 10 to the displacement directions 17-19 or to the pivoting directions 14, 15 and to the rotation directions 16 can be individually adapted to the requirements of the crane operator.

Figure 4:
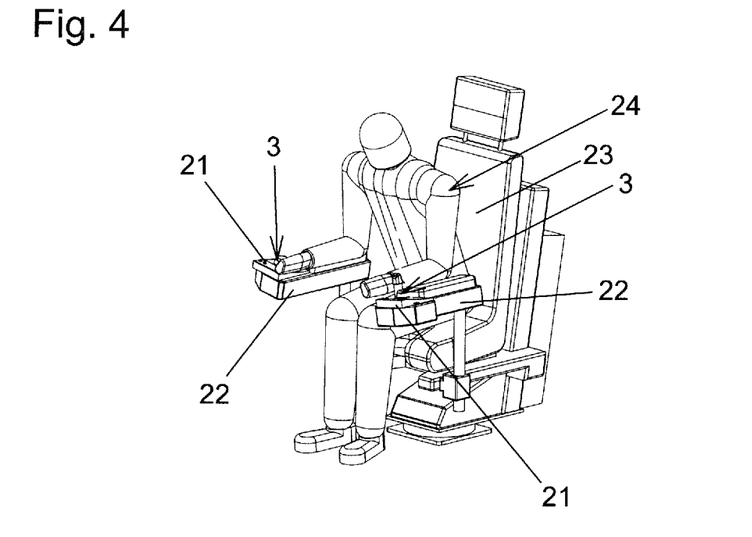
FIG. 4 shows a control seat having two operator-control panels according to FIG. 2.

In FIG. 4, there is also illustrated an example of a possible workstation for the crane operator 24 of the crane 30. The workstation comprises a control seat 23 for the crane operator 24. The control seat 23 has two armrests 22 on each of which an operator-control panel 21 according to FIG. 2 is arranged. According to his or her requirements, for example while preferring a certain hand to operate the crane 30, the crane operator 24 can operate the crane 30 using one of the two operator-control panels 21. However, it is also conceivable and possible that the two operator-control panels 21 are used simultaneously by the crane operator 24. The workstation illustrated in FIG. 4 of the crane operator 24 could, as is also preferred in the exemplary embodiments still to be explained of cranes 30 according to the invention, be arranged in a control cab 20 of the crane 30, cf. for example FIG. 5. The control electronics 2 can be arranged in the control cab 20 or outside the control cab 20 on the crane 30.

Figure 5:
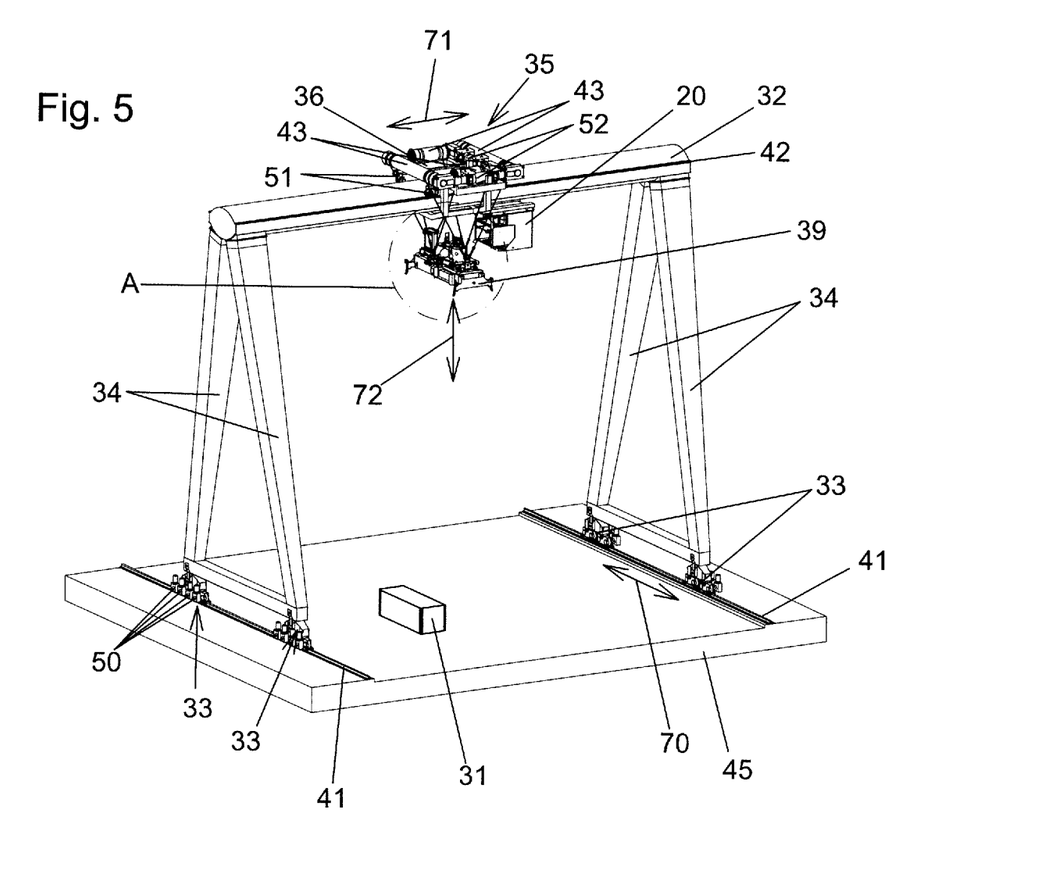
FIG. 5 shows an isometric view of a first exemplary embodiment of a crane according to the invention.
Figures 6, 7:
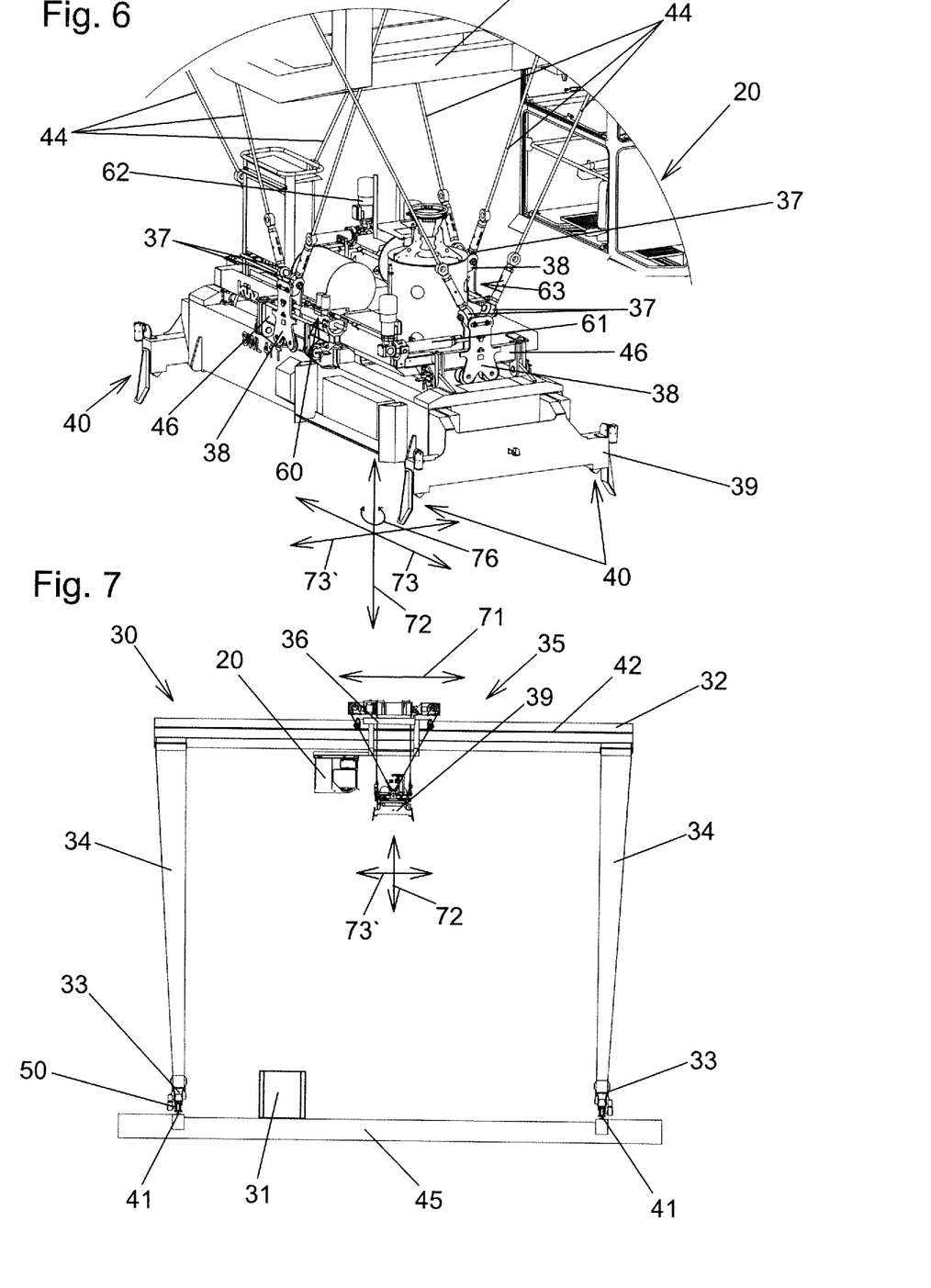
FIG. 6 shows the detail A of FIG. 5.
FIG. 7 shows a view of the crane shown in FIG. 5 as seen parallel to a longitudinal extent of the crane rails.

A discussion will now be given in the following of a first application example of the crane controller 1 according to the invention in a crane 30 according to the invention configured as a gantry crane. The crane 30 has a crane girder 32 which is supported on running-gear units 33 of the crane 30 by way of uprights 34. The crane girder 32 spans a region for handling containers 31, for example a container setdown area of a container terminal. FIGS. 5 and 7 each illustrate only one container 31.

The running-gear units 33 are supported on crane rails 41 which are laid on the ground 45. In the exemplary embodiment, the crane 30 is movable as a whole in mutually opposed crane travel directions 70 along the crane rails 41. In the exemplary embodiment, each of the running-gear units 33 has four travel drives 50 for driving crane running wheels, which are not designated in further detail. Activating the travel drives 50 makes it possible for the crane 30 with the crane girder 32 to be moved in the mutually opposed crane travel directions 70, cf. FIG. 5.

Furthermore, the crane 30 has a transport device 35 with a trolley 36. The trolley 36 is mounted displaceably on the crane girder 32. The trolley 36 is supported by means of trolley running-gear units, which are not designated in further detail, on trolley rails 42 arranged on the crane girder 32. In the exemplary embodiment, the trolley 36 has four trolley drives 51 for moving the trolley 36 along the crane girder 32 in mutually opposed trolley movement directions 71.

The control cab 20 of the crane 30 is fastened to the trolley 36.

The transport device 35 comprises a load-receiving device 39 which is suspended on the trolley 36 so as to be liftable and lowerable by means of cables 44. The cables 44 can be wound and unwound on cable drums 43 which are rotatably mounted on the trolley 36. In the first application example, the transport device 35 has two hoisting gear drives 52 for rotating the cable drums 43, and thus for moving the load-receiving device 39 relative to the trolley 36 in mutually opposed lifting/lowering directions 72. In each case two of the cable drums 43 can be driven by one of the hoisting gear drives 52 by means of gear mechanisms, which are not designated in further detail.

FIG. 5 illustrates the possible travel movements of the crane 30 in the coarse-positioning mode of the crane controller 1. The actuators of the crane 30 that can be activated by means of the input device 3 thus comprise the travel drives 50 for moving the crane 30 in the mutually opposed crane travel directions 70, and the trolley drives 51 for moving the trolley 36 in the mutually opposed trolley movement directions 71, and the hoisting gear drives 52 for moving the load-receiving device 39 in the mutually opposed lifting/lowering directions 72. In the coarse-positioning mode, large distances can be covered in a short time by the crane 30 and by the trolley 36 and by the load-receiving device 39.

In the first exemplary embodiment, there is provision that, in the coarse-positioning mode, only displacements of the grip part 4 of the input device 3, that is to say translational adjustments of the grip part 4, in the displacement directions 17, 18, 19 are used by the control electronics 2 of the crane controller 1 to activate the travel drives 50 and the trolley drives 51 and the hoisting gear drives 52. In the first exemplary embodiment, pivoting movements of the grip part 4 in the pivoting directions 14, 15 or rotational movements of the grip part 4 about the main axis 5 remain out of consideration by the control electronics 2 in the coarse-positioning mode.

In the first exemplary embodiment, there is provision in the coarse-positioning mode that the adjustment of the grip part 4 in the displacement directions 19 are converted to a movement of the crane 30 in the mutually opposed crane travel directions 70. Here, all the travel drives 50 of the running-gear units 33 are activated simultaneously, in particular synchronously, by the control electronics 2, in dependence on the degree of adjustment of the grip part 4 in the displacement directions 19.

An adjustment of the grip part 4 in the displacement directions 18 serves for moving the trolley 36 by means of the trolley drives 51 along the crane girder 32 in the mutually opposed trolley movement directions 71. Analogously, an adjustment of the grip part 4 in the displacement directions 17 leads to the relative movement of the load-receiving device 39 relative to the trolley 36 in the mutually opposed lifting/lowering directions 72.

An adjustment of the grip part 4 that has adjustment components in the aforementioned displacement directions 17, 18, 19 can be used for a superimposed movement of the crane 30 and of the trolley 36 and of the load-receiving device 39, as is also preferred. That is to say that the three mutually independent actuators of the crane 30, i.e. the travel drives 50 and the trolley drive 51 and the hoisting gear drives 52, can be driven simultaneously. As a result, an intuitive operation of the crane 30 by means of the crane controller 1 according to the invention can be realized.

In the coarse-positioning mode there occurs a coarse positioning of the crane 30 and of the trolley 36 and of the load-receiving device 39. On account of the large moving masses, inter alia if the intrinsic weight of the crane 30 is accelerated or decelerated during the positioning in the coarse-positioning mode, the accuracy of the positioning is limited.

The crane 30 illustrated in FIGS. 5-7 additionally has a fine-positioning device for the fine orientation of the load-receiving device 39 relative to the trolley 36. The fine-positioning device makes it possible to achieve precise positioning of the load-receiving device 39 for receiving a container 31 or for depositing a container 31. Various fine-positioning devices are known in the prior art.

In the first exemplary embodiment of the crane 30, there is provision that cable engagement points 37, which face away from the cable drum 43, of the cables 44 are displaceable relative to the load-receiving device 39, cf. FIG. 6. In the first exemplary embodiment of the crane 30, the respective cable engagement point 37 could also be referred to as a cable anchoring point. Cable anchorings serve for fastening or anchoring one end of a cable to a component and are sufficiently well known in the prior art. In the first exemplary embodiment, in each case two of the eight cables 44 engage on a displacement member 38 of the transport device 35.

The load-receiving device 39 has two mutually opposite longitudinal sides and two mutually opposite end sides oriented orthogonally to the longitudinal sides. These are not designated in further detail in the figures. The longitudinal sides have a larger extent than the end sides with respect to horizontal directions oriented orthogonally to one another. In the first exemplary embodiment, the longitudinal sides of the load-receiving device 39 are oriented parallel to a horizontal direction 73, and the end sides are oriented parallel to a horizontal direction 73'. The horizontal directions 73 are situated parallel to the mutually opposed crane travel directions 70, cf. FIGS. 5 and 6. The horizontal directions 73' are oriented parallel to the mutually opposed trolley movement directions 71.

On each of the longitudinal sides and end sides, the load-receiving device 39 has in each case a guide rail 46 which is oriented parallel to the respective longitudinal side or end side and on which in each case one of the displacement members 38 is displaceably mounted.

In the first exemplary embodiment of the crane 30 according to the invention, the fine-positioning device has fine-positioning drives 60-63, wherein in each case one of the fine-positioning drives 60-63 is assigned to one of the displacement members 38 and serves for displacing the respective displacement member 38 along the respective guide rail 46.

In the fine-positioning mode of the crane controller 1, the fine-positioning drives 60-63 can be activated by the control electronics 2 for fine orientation of the load-receiving device 39 relative to the trolley 36 in the horizontal directions 73, 73' oriented orthogonally to the lifting/lowering directions 72. A movement of the load-receiving device 39 in the horizontal directions 73 can be brought about for example by a displacement of the displacement members 38 arranged on the longitudinal sides of the load-receiving device 39, with the drives 60 and 63 then being driven by the control electronics 2. A displacement in the horizontal directions 73' occurs by a displacement of the displacement members 38 arranged on the end sides of the load-receiving device 39 as a result of activating the fine-positioning drives 61, 62 by means of the control electronics 2.

Furthermore, a yawing of the load-receiving device 39, that is to say a rotation of the load-receiving device 39 about the lifting/lowering directions 72, that is to say the vertical, can be realized by means of the fine-positioning drives 60-63. To better illustrate this movement possibility, FIG. 6 depicts the yawing directions 76.

In the fine-positioning mode of the crane controller 1, there is provision in the first exemplary embodiment of the crane 30 that, in addition to the fine-positioning drives 60-63, the hoisting gear drives 52 can also be activated. It is advantageous here if the movement speed of the hoisting gear drives 52 is less in the fine-positioning mode than in the coarse-positioning mode. It is thereby possible to input or prescribe a precise and sensitive positioning of the load-receiving device 39 in the mutually opposed lifting/lowering directions 72, that is to say in the vertical.

In the first exemplary embodiment of the crane 30, there is provision in the fine-positioning mode that an adjustment of the grip part 4 in the displacement directions 19 is converted by the control electronics 2 into a movement of the load-receiving device 39 in the horizontal directions 73. Here, the fine-positioning drives 60 and 63 arranged on the longitudinal side of the load-receiving device 39 are activated by the control electronics 2 in dependence on the degree of adjustment of the grip part 4 in the displacement directions 19. In an analogous manner, an adjustment of the grip part 4 in the displacement directions 18 can be converted by the control electronics 2 into a movement of the load-receiving device 39 in the horizontal directions 73'. Analogously, an adjustment of the grip part 4 in the displacement directions 17 leads to the relative movement of the load-receiving device 39 relative to the trolley 36 in the mutually opposed lifting/lowering directions 72. Furthermore, a rotation of the grip part 4 about the main axis 5 leads to a yawing of the load-receiving device 39.

An adjustment of the grip part 4 that has adjustment components in the aforementioned displacement directions 17-19 and a rotational movement about the main axis 5 can be used to produce a superimposed movement of the load-receiving device 39 relative to the trolley 36, as is also preferred.

In the exemplary embodiment, the switching between the fine-positioning mode and the coarse-positioning mode of the crane controller 1 occurs with the switching element 8 already explained above, wherein the coarse-positioning mode is activated in the first switching position, and the fine-positioning mode of the crane controller 1 is activated in the second switching position.

Figure 8:
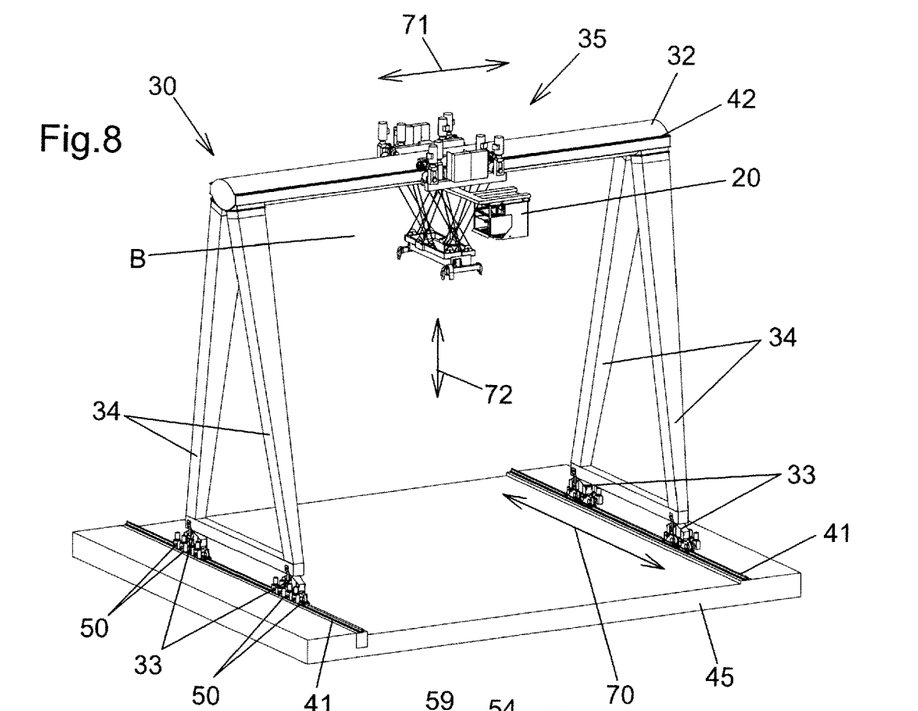
FIG. 8 shows an isometric view of a second exemplary embodiment of a crane according to the invention.
Figure 9:
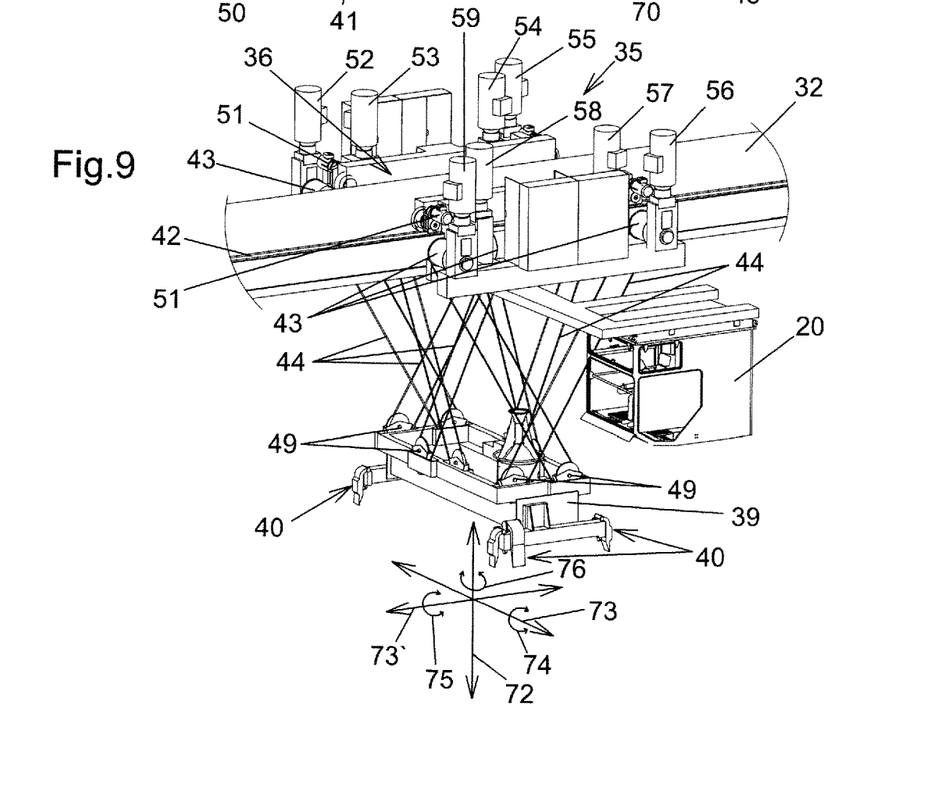
FIG. 9 shows the detail B of FIG. 8.

FIGS. 8 and 9 illustrate a second exemplary embodiment of a crane 30 having a crane controller 1 according to the invention. The structural design of the crane 30 corresponds, apart from details of the transport device 35, in very large part to that of the exemplary embodiment illustrated in FIGS. 5 to 7, and therefore, in the explanations pertaining to the second exemplary embodiment, reference is primarily made to the differences over the first exemplary embodiment of the crane 30. Apart from the differences specified below, the explanations pertaining to the first exemplary embodiment of the crane 30 thus also apply to the second exemplary embodiment.

One difference of the second exemplary embodiment of the crane 30 lies in the fact that the cables 44 can each be wound up on a dedicated cable drum 43, wherein the speed and/or the direction of rotation for all cable drums 43 can in each case be individually set. For this purpose, the transport device 35 has eight hoisting gear drives 52-59 for individually driving the cable drums 43. The cables 44 are in each case deflected on deflection pulleys 49 arranged on the load-receiving device 39. That end of a respective cable 44 which faces away from the cable drum is anchored on the trolley 36. This is not separately illustrated in the figures.

In the second exemplary embodiment, the load-receiving device 39 has six degrees of freedom with respect to the trolley 36, wherein a movement of the load-receiving device 39 in the lifting/lowering directions 72 and the horizontal directions 73, 73' and rotations of the load-receiving device 39 about the lifting/lowering directions 72 and about the horizontal directions 73, 73' occurs exclusively by a corresponding winding and unwinding of the cables 44 on the respective cable drum 43.

In the coarse-positioning mode of the crane controller 1, the actuators of the crane that can be activated by means of the input device 3 comprise, analogously to the first exemplary embodiment, the travel drives 50 for moving the crane 30 in mutually opposed crane travel directions 70, and the trolley drives 51 for moving the trolley 36 along the crane girder 32 in mutually opposed trolley movement directions 71.

There is also provision in the second exemplary embodiment that, in the coarse-positioning mode of the crane controller 1, the hoisting gear drives 52-59 can be activated to move the load-receiving device 39 relative to the trolley 36 in mutually opposed lifting/lowering directions 72. In the coarse-positioning mode, there is provision here that all hoisting gear drives 52-59 are activated synchronously, with the result that exclusively a movement of the load-receiving device 39 relative to the trolley 36 occurs in the mutually opposed lifting/lowering directions 72.

In the fine-positioning mode of the crane controller, there is provision that the actuators of the crane 30 that can be activated by means of the input device 3 comprise all the hoisting gear drives 52-59, wherein the hoisting gear drives 52-59 can be activated independently of one another for the fine orientation of the load-receiving device 39 relative to the trolley 36, as has already been indicated.

The individual activation of the hoisting gear drives 52-59 allows the load-receiving device 39 to be able to move in horizontal directions 73, 73' oriented orthogonally to the lifting/lowering directions 72 and in the mutually opposed lifting/lowering directions 72. Here, the movement in the mutually opposed lifting/lowering directions 72 occurs again by synchronous activation of all the hoisting gear drives 52-59, wherein there is provision that the highest movement speed in the fine-positioning mode is less than in the coarse-positioning mode. Furthermore, a rolling and pitching and yawing of the load-receiving device 39 is also possible by means of the individual setting of the speed and/or the direction of rotation of the cable drums 43, wherein the free cable length of the cables 44 is set individually.

With reference to FIGS. 2 and 3, there can be provision here that an adjustment of the grip part 4 parallel to the main axis 5 occurs in order to carry out a movement of the load-receiving device 39 in the mutually opposed lifting/lowering directions 72. A pivoting movement of the grip part 4 in the pivoting direction 14 can correspondingly be converted into a rolling movement of the load-receiving device 39 about the horizontal direction 73, with a rotation of the load-receiving device 39 in the rolling directions 74 then occurring, cf. FIG. 9. A pitching of the load-receiving device 39 in the pitching directions 75 then occurs for example by a pivoting movement of the grip part 4 in the pivoting directions 15. A rotation of the grip part 4 leads to a yawing of the load-receiving device 39 in the yawing directions 76, etc.

As a result, the crane operator 24 can use one hand to perform the fine positioning of the load-receiving device 39 with respect to the six degrees of freedom of the load-receiving device 39. This has the advantage that translational movements of the grip part 4 can be directly converted by the crane controller 1 into translational movements of the load-receiving device 39.

Figure 10:
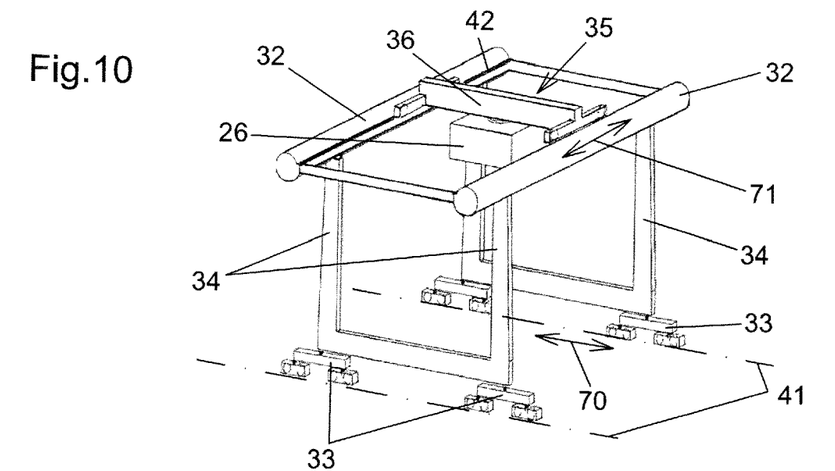
FIG. 10 shows an isometric view of a third exemplary embodiment of a crane according to the invention.
Figure 11:
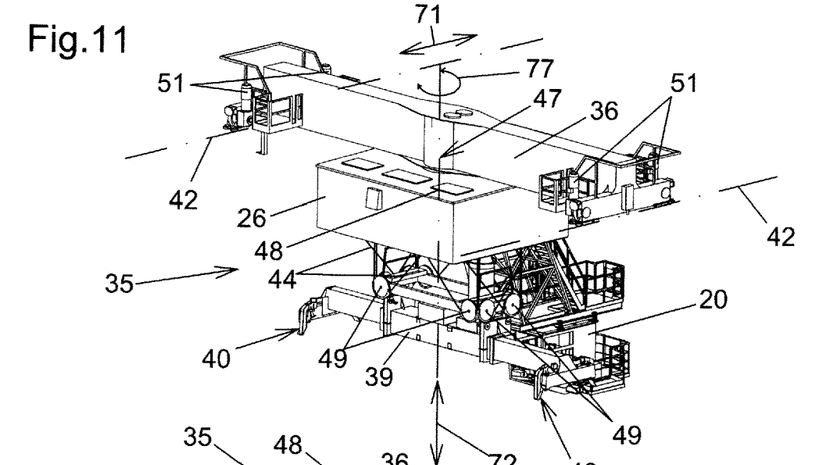
FIG. 11 shows an isometric illustration of a transport device of the crane illustrated in FIG. 10.
Figure 12:
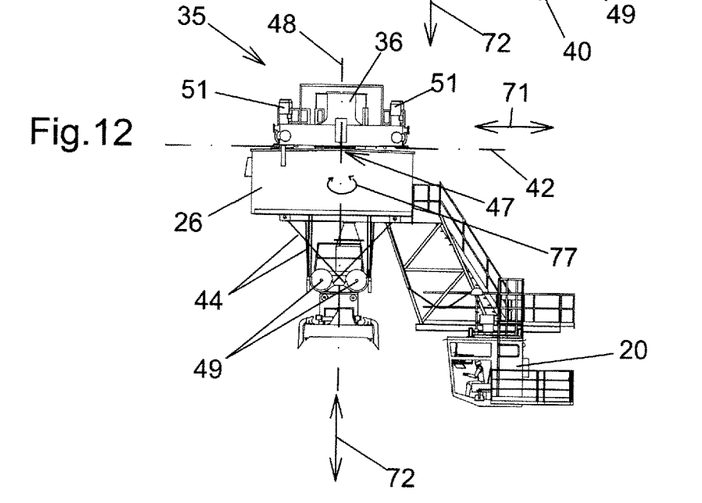
FIG. 12 shows a view of the transport device according to FIG. 11 as viewed orthogonally to trolley rails of the crane.

FIGS. 10 to 12 illustrate a third exemplary embodiment of a crane 30 having a crane controller 1 according to the invention. The design of the crane 30 and in particular the coarse-positioning mode corresponds in very large part to that of the first exemplary embodiment illustrated in FIGS. 5 to 7, with the result that, in the explanations pertaining to the third exemplary embodiment, reference is primarily made to the differences over the first exemplary embodiment of the crane 30. Apart from the differences specified below, the explanations pertaining to the first exemplary embodiments of the crane 30 thus also apply to the third exemplary embodiment.

FIG. 10 shows an isometric view of the crane 30 of the third exemplary embodiment. As a difference from the first two exemplary embodiments, the crane 30 has two crane girders 32, wherein the transport device 35 is in each case supported on a trolley rail 42 arranged on the respective crane girder 32. The crane 30 of the third exemplary embodiment could also be referred to as a two-girder crane. Cranes 30 having two crane girders 32 are sufficiently well known. FIG. 10 does not depict the load-receiving device 39.

FIGS. 11 and 12 illustrate the transport device 35 of the crane 30. The transport device 35 again has trolley drives 51 for moving the trolley 36 along the crane girders 32 in mutually opposed trolley movement directions 71. The trolley rails 42 are indicated only by dot-dash lines in FIGS. 11 and 12. Furthermore, the transport device 35 comprises a hoisting gear arrangement 26 which has a housing for protecting the hoisting gear drives, which are not visible in the figures. The hoisting gear drives are configured analogously to the first exemplary embodiment of the crane 30. As a departure from the first exemplary embodiment, the cables 44 are deflected by means of deflection pulleys 49, analogously to the second exemplary embodiment, on the load-receiving device 39. However, in another embodiment, it would also be possible for the hoisting gear drives to be configured analogously to the second exemplary embodiment.

In the third exemplary embodiment of the crane 30 according to the invention, the transport device 35 comprises a slewing gear 47 for rotating the hoisting gear arrangement 26 relative to the trolley 36 about an axis of rotation 48. The axis of rotation 48 is situated parallel to the vertical, that is to say parallel to the lifting/lowering directions 72.

Slewing gears 47 are known in crane construction, in particular in gantry cranes. The slewing gear 47 has a slewing gear drive, which is not illustrated. For example, the slewing gear 47 could have a toothed rim and a gear motor having at least one pinion meshing with the toothed rim. A rotation of the hoisting gear arrangement 26 will also rotate the load-receiving device 39 relative to the trolley 36.

In the coarse-positioning mode of the crane controller 1, there is provision in the third exemplary embodiment of the crane 30 that the crane 30 is movable in the mutually opposed crane travel directions 70, and the trolley 36 is movable in the mutually opposed trolley movement directions 71, and the load-receiving device 39 is movable in the mutually opposed lifting/lowering directions 72. Reference is made in this respect in particular to the explanations pertaining to the first exemplary embodiment of the crane 30.

In the third exemplary embodiment, there is additionally provision in the coarse-positioning mode that the hoisting gear arrangement 26 can be rotated with the load-receiving device 39 about the axis of rotation 48. For this purpose, the rotation directions 77 are depicted in FIGS. 11 and 12. That is to say that, in the coarse-positioning mode, the slewing gear drive of the slewing gear 47 can be activated by the control electronics 2 to rotate the load-receiving device 39 relative to the trolley 36 about the axis of rotation 48.

In the third exemplary embodiment, there is thus provision in the coarse-positioning mode that a rotation of the grip part 4 about the main axis 5 is converted to a rotation of the load-receiving device 39 relative to the trolley about the axis of rotation 48. Here, the slewing gear drive of the slewing gear 47 is activated by the control electronics 2 in dependence on the degree of rotation of the grip part 4 about the main axis 5.

No fine-positioning drives are depicted in FIGS. 10-12 for the third exemplary embodiment. However, the fine positioning could be realized analogously to the first exemplary embodiment or, if the hoisting gear drives are configured analogously to the second exemplary embodiment, also correspondingly to the second exemplary embodiment.

Figure 13:
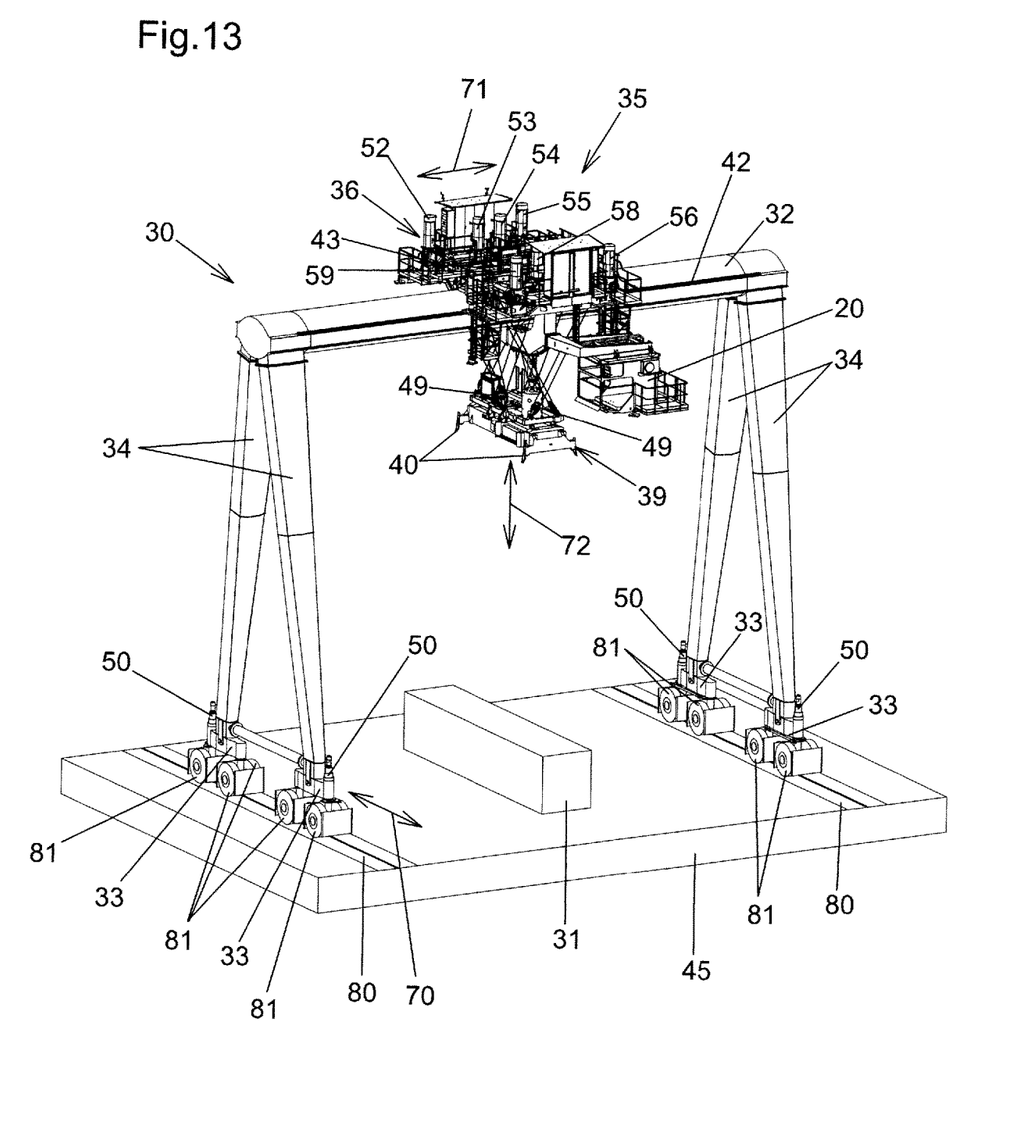
FIG. 13 shows an isometric illustration of a fourth exemplary embodiment of a crane according to the invention.

FIG. 13 illustrates a fourth exemplary embodiment of a crane 30 having a crane controller 1 according to the invention. The design of the crane 30 and in particular the fine-positioning mode corresponds in very large part to that of the second exemplary embodiment illustrated in FIGS. 8 and 9, and therefore, in the explanations pertaining to the third exemplary embodiment, reference is primarily made to the differences over the second exemplary embodiment of the crane 30. Apart from the differences specified below, the explanations pertaining to the second exemplary embodiment of the crane 30 thus also apply to the fourth exemplary embodiment.

As a difference from the second exemplary embodiment, there is provision in the fourth exemplary embodiment of the crane 30 that the uprights 34 of the crane 30 are supported on rubber-tired running-gear units 33. In the fourth exemplary embodiment, the respective running-gear unit 33 has tires 81 which each have a tread made of rubber. The tires 81 can be air-filled. The treads of the tires 81 are supported on tracks 80 on the ground 45. The crane 30 of the fourth exemplary embodiment is thus mounted so as to be movable on the track 80. In the fourth exemplary embodiment, each of the running-gear units 33 has travel drives 50 for driving at least one of the tires 81. Activating the travel drives 50 makes it possible for the crane 30 with the crane girder 32 to be moved in the mutually opposed crane travel directions 70, cf. FIG. 13.

The crane 30 of the fourth exemplary embodiment could also be referred to as a rubber-tired gantry crane or rubber-tired stacking crane.

In the coarse-positioning mode of the crane controller 1, there is provision in the fourth exemplary embodiment of the crane 30 that the crane 30 is movable in the mutually opposed crane travel directions 70 along the tracks 80, and the trolley 36 is movable in the mutually opposed trolley movement directions 71, and the load-receiving device 39 is movable in the mutually opposed lifting/lowering directions 72. Reference is made in this respect in particular to the explanations pertaining to the second exemplary embodiment of the crane 30.

Optionally, the running-gear units 33 or individual tires 81 of the running-gear units 33 of the crane 30 of the fourth exemplary embodiment could be rotatable about a vertical axis by means of steering drives, this not being separately illustrated in FIG. 13. This makes it possible for the crane 30 to move around curves, that is to say for the crane 30 to rotate about the vertical. Furthermore, it is possible to realize a transfer of the crane 30 in transfer directions oriented in particular orthogonally to the mutually opposed crane travel directions 70 so as to change tracks 80. This allows different set-down areas for containers 31, so-called container aisles, to be served by the crane 30. The activation of the steering drives could in turn occur in the coarse-positioning mode by means of the grip part 4 of the input device 3. There could then be provision in the coarse-positioning mode that a rotation of the grip part 4 about the main axis 5 can be converted to a rotation of the entire crane 30, in particular of the tires 81 of the running-gear units 33, about the vertical.

Analogously to the second exemplary embodiment, the transport device 35 has eight hoisting gear drives 52-59 to individually drive the cable drums 43. The hoisting gear drive 57 is concealed in FIG. 13 by a control cabinet and is therefore not visible. The cables, which are not designated in more detail, of the transport device 35 are, analogously to the second exemplary embodiment, in each case deflected on deflection pulleys 49 arranged on the load-receiving device 39. That end of a respective cable 44 which faces away from the cable drum is anchored on the trolley 36. This is not illustrated separately in FIG. 13. The fine positioning of the load-receiving device 39 relative to the trolley 36 occurs correspondingly to the second exemplary embodiment, and therefore reference is made to the explanations pertaining to the second exemplary embodiment of the crane 30.

In the depicted exemplary embodiments of the cranes 30 according to the invention, the load-receiving device 39 comprises gripping elements 40 for connecting at least one container 31 to the load-receiving device 39. Such lockable gripping elements 40 are known and are also referred to as twist locks. In the exemplary embodiments, the gripping elements 40 also additionally comprise foldable guide tabs, which are also referred to as "flippers". The actuation of the gripping elements 40 can occur for example using the operator-control elements 13 arranged on the operator-control panel 21, cf. FIG. 2. In other exemplary embodiments of the crane controller 1, there could be provided still further operator-control elements 13 on the operator-control panel 21 for activating further actuators of the crane 30.

In the exemplary embodiments, the cranes 30 illustrated are in each case gantry cranes. However, the crane controller 1 according to the invention could also be used in other design forms of cranes. For example, the crane controller could be used in bridge cranes or other cranes for handling containers 31 or other loads. Furthermore, the crane controller 1 according to the invention could also be used in slewing tower cranes.

In the exemplary embodiment illustrated in FIGS. 1 to 3 of a crane controller 1, there is provision that the grip part 4 has six degrees of freedom. This is not mandatory and depends on the conditions of the crane 30. For example, a possibility for rotating the grip part 4 about the main axis 5 could be dispensed with if the crane 30 has no corresponding actuators for implementing these input commands.

In the first exemplary embodiment illustrated in FIGS. 5 to 6 of the crane 30, fine positioning is possible by finely orienting the load-receiving device 39 relative to the trolley 36 in the horizontal directions 73, 73' oriented orthogonally to the lifting/lowering directions 72 and in the mutually opposed lifting/lowering directions 72. Furthermore, yawing of the load-receiving device 39, that is to say a rotation about the mutually opposed lifting/lowering directions 72, is also possible. It would be conceivable, in a modified design form of the crane 30, also to provide pitching or rolling of the load-receiving device 39, as has been explained in connection with the second exemplary embodiment of the crane 30 according to the invention. For this purpose, it would be possible for example to shorten or lengthen the free cable lengths of those portions of the cables 44 which face away from the cable drums 43. For example, it would be possible to provide auxiliary units known per se to shorten the free cable length in order to realize tilting movements of the load-receiving device 39 about the horizontal directions 73, 73'. The activation of the auxiliary units advantageously likewise occurs with the input device 3, for example by detection of pivoting movements of the grip part 4 in the pivoting directions 14, 15 and conversion thereof in the control electronics 2 to activate these auxiliary units.

| Key to the Reference Numbers: | |
|---|---|
| 1 | Crane controller |
| 2 | Control electronics |
| 3 | Input device |
| 4 | Grip part |
| 5 | Main axis |
| 6, 6' | Pivoting plane |

-continued

| Key to the Reference Numbers: | |
|---|---|
| 7 | Main plane |
| 8 | Switching element |
| 9 | Actuator |
| 10 | Actuator |
| 11 | Inputs |
| 12 | Outputs |
| 13 | Operator-control element |
| 14 | Pivoting directions |
| 15 | Pivoting directions |
| 16 | Rotation directions |
| 17 | Displacement directions |
| 18 | Displacement directions |
| 19 | Displacement directions |
| 20 | Control cab |
| 21 | Operator-control panel |
| 22 | Armrest |
| 23 | Control seat |
| 24 | Crane operator |
| 25 | Reference point |
| 26 | Hoisting gear arrangement |
| 30 | Crane |
| 31 | Container |
| 32 | Crane girder |
| 33 | Running-gear unit |
| 34 | Upright |
| 35 | Transport device |
| 36 | Trolley |
| 37 | Cable engagement point |
| 38 | Displacement member |
| 39 | Load-receiving device |
| 40 | Gripping element |
| 41 | Crane rail |
| 42 | Trolley rail |
| 43 | Cable drum |
| 44 | Cable |
| 45 | Ground |
| 46 | Guide rail |
| 47 | Slewing gear |
| 48 | Axis of rotation |
| 49 | Deflection pulley |
| 50 | Travel drive |
| 51 | Trolley drive |
| 52 | Hoisting gear drive |
| 53 | Hoisting gear drive |
| 54 | Hoisting gear drive |
| 55 | Hoisting gear drive |
| 56 | Hoisting gear drive |
| 57 | Hoisting gear drive |
| 58 | Hoisting gear drive |
| 59 | Hoisting gear drive |
| 60 | Fine-positioning drive |
| 61 | Fine-positioning drive |
| 62 | Fine-positioning drive |
| 63 | Fine-positioning drive |
| 70 | Crane travel directions |
| 71 | Trolley movement directions |
| 72 | Lifting/lowering directions |
| 73, 73' | Horizontal directions |
| 74 | Roll directions |
| 75 | Pitch directions |
| 76 | Yaw directions |
| 77 | Rotation directions |
| 80 | Track |
| 81 | Tire |

The invention claimed is:

1. A crane comprising:
   at least three actuators which can be activated independently of one another for moving at least one container or another load;
   a crane controller comprising:
   control electronics;
   at least one input device connected to the control electronics and having a grip part, the grip part having a main axis that is pivotable, together with the grip part in at least two pivoting directions oriented orthogonally to one another;

wherein the control electronics are configured to generate electrical signals for activating the at least three actuators of the crane, in dependence on an adjustment of the grip part relative to an original position of the grip part; and the grip part, with the main axis, is additionally displaceable in at least two mutually different displacement directions relative to the original position, and the control electronics are further configured to generate the electrical signals for activating the at least three actuators of the crane, in dependence on the adjustment of the grip part relative to the original position; and a crane girder, a trolley that travels on the crane girder, and a load-receiving device connected to the trolley, wherein the actuators of the crane, which are activatable by the input device in a coarse-positioning mode of the crane controller, comprise at least one travel drive configured for moving the crane girder of the crane in mutually opposed crane travel directions, and at least one trolley drive configured for moving the trolley of the crane along the crane girder in mutually opposed trolley movement directions, and at least one hoisting gear drive configured for moving the load-receiving device relative to the trolley in mutually opposed lifting/lowering directions.

2. The crane as claimed in claim 1, wherein a speed value of the at least three actuators is adapted to be varied by the control electronics, and the control electronics is configured to set the speed value in dependence on a degree of the adjustment of the grip part starting from the original position of the grip part.

3. The crane as claimed in claim 1, further comprising at least one resetting element for the grip part configured to automatically reset the grip part into the original position.

4. The crane as claimed in claim 1, further comprising a switching element which is switchable between a first switching position and a second switching position, wherein the coarse-positioning mode is activated in the first switching position, and a fine-positioning mode of the crane controller is activated in the second switching position.

5. The crane as claimed in claim 1, further comprising a control cab, and the at least one input device of the crane controller is arranged in the control cab.

6. The crane as claimed in claim 5, further comprising a control seat arranged in the control cab, and the at least one input device is located on the control seat.

7. The crane as claimed in claim 1, wherein the actuators of the crane, which are activatable by the input device in a fine-positioning mode of the crane controller, comprise fine-positioning drives or a plurality of hoisting gear drives which are activatable independently of one another for fine orientation of the load-receiving device relative to the trolley in at least one of the or in mutually opposed ones of the lifting/lowering directions, in horizontal directions oriented orthogonally to the lifting/lowering directions, or for at least one of rolling, pitching, or yawing of the load-receiving device.

8. The crane as claimed in claim 7, wherein the crane controller further comprises a switching element which is switchable between a first switching position and a second switching position, wherein the coarse-positioning mode is activated in the first switching position of the switching element, and the fine-positioning mode of the crane controller is activated in the second switching position of the switching element.

9. The crane as claimed in claim 1, wherein the grip part, with the main axis, is rotatable about the main axis.

10. A method for controlling travel movements of the crane as claimed in claim 1, comprising the control electronics generating the electrical signals for activating the at least three actuators of the crane, in dependence on the adjustment of the grip part relative to the original position of the grip part in at least one of the at least two pivoting directions oriented orthogonally to one another, in the at least two mutually different displacement directions, or about the main axis.

\* \* \* \* \*